(12) United States Patent
Von Mohos (10) Patent No.: US 12,428,152 B2
(45) Date of Patent: Sep. 30, 2025

(54) DEVICE AND METHOD FOR TAKING UP LIQUIDS INTO AN AIRCRAFT

(71) Applicants: Zoltán Von Mohos, Pulheim (DE); Javier Lopez, Cologne (DE)

(72) Inventor: Zoltán Von Mohos, Pulheim (DE)

(73) Assignees: Zoltán Von Mohos, Pulheim (DE); Javier Lopez, Cologne (DE)

( * ) Notice: Subject to any disclaimer, the term of this patent is extended or adjusted under 35 U.S.C. 154(b) by 0 days.

(21) Appl. No.: 18/717,612

(22) PCT Filed: Dec. 9, 2022

(86) PCT No.: PCT/EP2022/085143
§ 371 (c)(1),
(2) Date: Jun. 7, 2024

(87) PCT Pub. No.: WO2023/105038
PCT Pub. Date: Jun. 15, 2023

(65) Prior Publication Data
US 2025/0058875 A1    Feb. 20, 2025

(30) Foreign Application Priority Data
Dec. 9, 2021  (DE) .......................... 102021132473.4

(51) Int. Cl.
*B64D 1/22*         (2006.01)
(52) U.S. Cl.
CPC ....................... *B64D 1/22* (2013.01)
(58) Field of Classification Search
CPC ....................................... B64D 1/22
See application file for complete search history.

(56) References Cited

U.S. PATENT DOCUMENTS

| | | | |
|---|---|---|---|
| 2,117,234 A | 5/1938 | Austin et al. | |
| 3,972,494 A | 8/1976 | Drews | |
| 5,018,686 A | 5/1991 | Zimmer | |
| 9,957,047 B2* | 5/2018 | Benedik | B64D 1/22 |
| 11,365,004 B1* | 6/2022 | Celest | A62C 3/0228 |
| 12,012,209 B2* | 6/2024 | Benedik | B64D 1/16 |
| 2001/0054669 A1* | 12/2001 | Ramage | A62C 3/0228 |
| | | | 244/136 |
| 2018/0002019 A1 | 1/2018 | Benedik | |

FOREIGN PATENT DOCUMENTS

| | | |
|---|---|---|
| CN | 108910035 A | 11/2018 |
| CN | 109466687 A | 3/2019 |
| CN | 110053705 A | 7/2019 |

(Continued)

OTHER PUBLICATIONS

International Search Report and Written Opinion issued Mar. 13, 2023 in International Patent Application No. PCT/EP2022/085143 filed Dec. 9, 2022.

*Primary Examiner* — Timothy P. Kelly
(74) *Attorney, Agent, or Firm* — Dinsmore & Shohl LLP (57) ABSTRACT

Embodiments disclosed herein are directed to a device for accepting liquids, such as water, in an aircraft. The device includes at least one immersion element that includes at least one water inlet port, and a device for generating a gas bubble for at least partly surrounding the immersion element and/or a device for generating a gas film at least in part on the immersion element.

27 Claims, 1 Drawing Sheet

(56) References Cited

FOREIGN PATENT DOCUMENTS

| | | | |
|---|---|---|---|
| DE | 3625413 | A | 2/1988 |
| FR | 512775 | A | 1/1921 |
| FR | 1481100 | A | 5/1967 |
| FR | 2512775 | A1 | 3/1983 |
| GB | 2163710 | A | 3/1986 |
| WO | 0169058 | A2 | 9/2001 |
| WO | 2018165699 | A1 | 9/2018 |

* cited by examiner

DEVICE AND METHOD FOR TAKING UP LIQUIDS INTO AN AIRCRAFT

CROSS REFERENCE TO RELATED APPLICATIONS

This application is a U.S. national phase of International Application No. PCT/EP2022/085143, filed Dec. 9, 2022, which in turn claims priority to application DE 10 2021 132 474.4, filed on Dec. 9, 2021, the contents of both of which are incorporated herein by reference in their entirety.

TECHNICAL FIELD

The present disclosure relates to a device for taking up liquids into an aircraft, an installation kit and an aircraft as well as a method for taking up liquids into an aircraft.

BACKGROUND

Devices and methods for taking up liquids into an aircraft are known from the prior art. For example, FR 512 775 A discloses a device for filling the water tank of an aircraft during flight. This has a self-propelled torpedo with a scoop head, aileron and rudder as well as an electric transmission cable, tow rope and a supply hose with water tank. The torpedo can be controlled from the aircraft and water can be filled into the water tank by means of the hose.

The disadvantage of the prior art is that filling the water tank in the aircraft takes a long time in most cases. The aircraft has to fly very slowly in order to lower the device and pull it through the water. In addition, the device lowered into the water slows the aircraft down considerably, or high energies have to be applied to pull the device through the water. An additional disadvantage of the devices known from the prior art is that they can only be used by a few types of aircraft, as flying relatively close to the water surface is necessary. In fact, the known prior art has proven to be not practicable, as the self-propelled torpedo does not reach the speed of the aircraft and thus sufficiently relieve the aircraft's propulsion system.

SUMMARY

The object of the present disclosure is to provide an improved device and an improved method for taking up liquids in an aircraft. In addition, the object of the present disclosure is to provide a device with which liquid, such as water, can be quickly fed into a water tank in the aircraft. In addition, the object of the present disclosure is to provide a device and a method with which an aircraft can be refueled with liquid from a safe height. In addition, the object of the present disclosure is to provide a device and a method whereby the device can be towed through a body of water with the lowest possible energy input and to ensure the highest possible level of flight safety.

In accordance with the present disclosure, the object is solved by a device for taking up liquids into an aircraft including at least one immersion body with at least one water inlet opening and generating at least one gas bubble for at least partially enveloping the immersion body.

In addition, the object of the present disclosure is solved by a method for taking up liquids in an aircraft including the steps of
providing a device of the type mentioned above,
connecting the device to a water tank in an aircraft,
lowering the device into a body of water during a flight of the aircraft so that it is at least partially immersed into the body of water,
taking up water from the body of water via water inlet openings in an immersion body of the device.

In addition, the object according to the present disclosure is solved by using a device of the type mentioned above for loading an aircraft with liquid.

In addition, the object is solved in accordance with the present disclosure by an installation kit for an aircraft including a device of the type mentioned above and at least one water tank.

In addition, the object of the present disclosure is solved by an aircraft including a device of the type mentioned above and at least one water tank.

A device for taking up liquids, such as water, into an aircraft, such as an aeroplane, is proposed. The device includes at least one immersion body with at least one water inlet opening. In addition, the immersion body generates at least one gas bubble for at least partially enveloping the immersion body and/or generates a gas film at least partially on the immersion body.

Although forest fires and large-scale fires are a natural part of the environment in many areas of the world, they increasingly pose a threat to nature and society. In recent decades, global warming has contributed to an increase in the frequency and intensity of forest fires, causing them to spread to larger areas and last longer. Southern Europe, the Arctic Circle, the Amazon region, Australia and the USA are examples of how forest fires in 2019 are directly causing human casualties, severe air pollution, property damage, loss of wildlife and natural areas on a much larger scale than ever before. In addition, forest fires are responsible for around 8 billion tonnes of $CO_2$ per year, on top of global $CO_2$ emissions from industry, transport and households, as well as longer-term health damage from smoke inhalation. Reducing the impact of fires therefore has a huge impact on our society.

Better methods and greater capacity are needed for the fighting of forest fires and large-scale fires, including aerial firefighting. Large forest areas have no infrastructure, so aerial firefighting is often the only option.

There are two categories of fire-fighting aircraft: amphibious bailers, such as the Canadair CL 415, and non-amphibious aircraft that need to refill water or extinguishing agents at airports. The CL 415 has been taken out of production by Bombardier and the existing fleet is outdated. Non-amphibious aircraft are less effective as fire-fighting aircraft as they have to return to an airport after each drop to refill with water and on average only make one drop per hour.

With the proposed device, an average of five drops per hour can be made. This represents a significant increase in aerial fire-fighting capacity, while at the same time greatly reducing the cost of fire-fighting. As such, no special fire-fighting aircraft need to be purchased to achieve this fire-fighting capacity.

Aeroplanes and helicopters each have their strengths and weaknesses, and both are complementary and needed to combat the increasing forest fire threat. The present device can be used by both helicopters and aeroplanes.

For example, an installation kit, which is configured as a pallet-based "roll-on roll-off" system, can be provided with at least one water tank and the device, which enables a role change between a transport aircraft and a fire-fighting aircraft within a few hours.

The device with a water tank can be easily installed as an installation kit in current and future conventional transport aircraft or troop carriers within about two hours. The device can be used to collect water while flying over a body of water. The device is configured as mission equipment and does not require any structural changes to the aircraft.

The device is may be used with a water tank. The water tank may include a tubular frame in which a sling tank is installed. Several water tanks can be coupled so that a desired total water volume, which can be carried by the aircraft, can be achieved. This configuration allows the device to be optimally adapted to the respective aircraft conditions.

As an advantage, in contrast to concepts known from the prior art, water can be picked up at wave heights greater than 1.5 m, especially since the immersion body is not only guided on the water surface. For example, during the flight, the immersion body can be lowered on a hose and/or by a device for deployment and insertion into the body of water. The water flows into the immersion body through the hose and fills a tank into an aircraft. This does not require a pump, as the back pressure of the water, which is sufficiently high due to the dragging of the immersion body through the body of water, conveys the water into the water tank.

The proposed device succeeds in an advantageous way in minimizing the water resistance at the immersion body in such a way that the thrust of the respective aircraft, such as an aeroplane, available for the operation is sufficient to pull the immersion body through the body of water at an operating speed of about 100 km/h to about 300 km/h. For example, at about 150 km/h to about 250 km/h, or in further example, at about 160 km/h to about 250 km/h.

If the term "about" is used in the context of the present disclosure in connection with values or value ranges or directional indications such as "towards", this is to be understood as a tolerance range which the person skilled in the art considers to be customary in this field, in particular a tolerance range of ±20%, preferably ±10%, further preferably ±5% is provided. Insofar as different value ranges, for example preferred and further preferred value ranges, are specified in the present disclosure, the lower limits and the upper limits of the different value ranges can be combined with one another.

In some embodiments, the device includes a hose, which is further arranged at the upper end of the immersion body. The hose may be a communicating connection between the immersion body and a water tank, which may be arranged in an aircraft.

In one embodiment, it is provided that the immersion body includes a sword section. In one embodiment, it is provided that the immersion body includes a sword section, wherein the sword section has a longitudinal extension with an upper end and a lower end. In one embodiment, it is provided that, as a function of a centre of gravity of the device, the longitudinal extension of the sword section is oriented at an angle not equal to 90°. For example, the angle may be about 20° to about 75°. In another example, the angle may be about 30° to about 60°, inclined rearwardly or forwardly with respect to a horizontal in the direction of movement of the device.

In another embodiment, the cross-section of the sword section is streamlined or fluid mechanically optimised. The sword section may have a wedge-shaped or teardrop-shaped cross-section.

In another embodiment, it is provided that the immersion body includes at least one torpedo-shaped section. The torpedo-shaped section may include a torpedo body. In addition, the torpedo body may be an approximately elliptical body, which can be further described approximately by the formula $(x/(1/2))^2+(y/(d/2))^{2.4}=1$, in which x and y are spatial coordinates, 1 is the length of the torpedo body and d is the largest diameter of the torpedo body.

The torpedo-shaped section may be arranged at the lower end of the sword section.

For the purposes of the present disclosure, the terms "down" and "up" are to be understood in the intended use of the device. In particular, "top" and "bottom" are determined by the gravity vector when the device is towed through a body of water. In addition, "bow" and "stern" of the device, preferably of the immersion body, are defined by the direction of movement, with the bow in particular defining the front part of the device in the direction of movement and the stern defining the rear part of the device in the direction of movement. The direction of movement is the direction in which the device is towed through the body of water. The direction of movement is the direction of flight of the aircraft.

The device includes the immersion body, which can be at least partially immersed into the body of water or towed through it.

In one embodiment, the immersion body includes at least one water conduit. The immersion body includes a plurality of water conduits. As an advantage, the arrangement of the one or more water conduits can influence the centre of gravity of the device in such a way that the latter can be towed through the body of water in a positionally stable manner. The sword section and/or the torpedo-shaped section may include one or more water conduits. In one embodiment, it is provided that the immersion body or the sword section and/or the torpedo-shaped section is divided into a plurality of water-conducting compartments such that each water-conducting compartment is a water conduit. In one embodiment, it is provided that the at least one water conduit has at least one non-return flap. Advantageously, the non-return flap prevents the water from flowing back if the immersion body emerges at least partially from the body of water, for example when pushing through wave troughs. In one embodiment, it is provided that the non-return flaps are adapted to be openable in order to open them when the immersion body is introduced into an aircraft to enable the hose to be emptied or rolled up.

The at least one water conduit opens into the at least one water inlet opening on one side. In addition, the water conduit is connected to the hose in a communicating manner. The immersion body includes a plurality of water inlet openings. In addition, the sword section and/or the torpedo-shaped section each include at least one water inlet openings. In some embodiments, the at least one water inlet opening is a plurality of water inlet openings. The at least one water inlet opening is arranged at a bow of the immersion body. As an advantage, the water inlet opening is arranged on the immersion body in such a way that a normal vector of the water inlet opening is directed in the direction of movement. The at least one water inlet opening can also be arranged on flanks of the immersion body.

The immersion body of the device according to the present disclosure may include at least one air outlet configured for generating at least one gas bubble for at least partially enveloping/covering the immersion body and/or generating a gas film at least partially on the immersion body. One or more gas bubbles or a gas film can be generated by the at least one air outlet, which are applied to the immersion body or brush past it and cover it in this way. A plurality of gas bubbles can be generated, which lie against the immersion body and/or pass by it, thus forming a gas film and covering the immersion body. If a plurality or a plurality of gas bubbles combine to form a single gas bubble, this envelops or at least partially covers the immersion body. It should be understood that partial enveloping of the immersion body to mean covering at least a section of the immersion body with one or more gas bubbles. At low towing speeds, such as, without limitation, at a towing speed below about 35 m/s or a towing speed at which supercavitation does not yet occur, a large number of gas bubbles can be generated, which sweep past the immersion body or lie against it and thus cover it. Advantageously, the flow resistance of the immersion body into the body of water is reduced by the fact that the gas bubble or bubbles act as a separating agent between the water and the immersion body. At higher towing speeds, such as, without limitation, above about 35 m/s, at least one gas bubble can be formed, whereby the at least one gas bubble encloses the immersion body from bow to stern. Exactly one gas bubble surrounds the immersion body from the bow, starting from the where the bubble is generated at the bow, to the stern.

In one embodiment, it is provided that at least one of at least one cavitator adapted for generating at least one gas bubble at least partially around the immersion body and/or a device such as the at least one air outlet opening may be provided to generate the at least one gas bubble for at least partially enveloping the immersion body or generating the gas film at least partially on the immersion body. In one embodiment, it is provided that the immersion body has at least one air outlet opening. The air outlet openings are connected to the atmosphere or to a compressed air generator by one or more air conduits.

In one embodiment, it is provided that at least one air outlet opening is adapted as a Venturi nozzle. In other embodiments, a a plurality of air outlet openings are adapted as Venturi nozzles. In other embodiments, all air outlet openings, are adapted as Venturi nozzles. The air outlet direction, such as a normal vector of the air outlet opening on the surface defined by the air outlet opening, is directed approximately in the direction of a stern of the immersion body, such as directed approximately in the opposite direction to the direction of movement. In this way, the atmospheric air can be used to generate at least one gas bubble at least partially around the immersion body, without the use of a compressed air generator.

In one embodiment, it is provided that air inlet openings of the air conduit of the device are arranged in such a way that, when the device is used as intended, they are arranged above a water surface of the body of water. In addition, the air inlet direction, such as the normal vector of the air inlet opening on the surface defined by the air inlet opening, is directed approximately in the direction of movement. With this advantageous embodiment, the dynamic pressure of the air flowing towards the device during towing can be used to generate at least one gas bubble at least partially around the immersion body. In one embodiment, it is provided that air inlet openings with a normal vector in the direction of movement and air outlet openings communicating with these with a normal vector against the direction of movement, or venturi nozzles, are arranged on the device.

In one embodiment, the sword section includes the at least one air outlet opening. In an additional embodiment, the torpedo-shaped section includes the at least one air outlet opening. In an additional embodiment, the sword section and the torpedo-shaped section include air outlet openings.

In an additional embodiment, it is provided that the at least one air outlet opening is arranged downstream of the at least one water inlet opening in a direction of movement of the device. Advantageously, the air flowing out of the air outlet opening can be prevented from being sucked in through the water inlet opening.

In an additional embodiment, it is provided that a plurality of water inlet openings and air outlet openings are provided. The air inlet openings and/or the air outlet openings are arranged at the bow of the immersion body. In one embodiment, it is provided that the immersion body includes a bow, wherein the at least one water inlet opening and the at least one air outlet opening are arranged at the bow. In an additional embodiment of the device, it is provided that a plurality of air outlet openings are arranged along the bow in longitudinal extension of the device. In an additional embodiment, it is provided that at least one of air outlet openings are arranged on flanks of the immersion body. In other embodiments, a plurality of air outlet openings are arranged on flanks of the immersion body. In other embodiments, air outlet openings are arranged on the sword section and/or on the torpedo-shaped section.

In an additional embodiment, it is provided that the immersion body or the sword section and/or the torpedo-shaped section includes at least one device for conducting air. In one embodiment, it is provided that the at least one device for conducting air connects the air inlet opening to the air outlet opening. In an additional embodiment, it is provided that the at least one device for conducting air connects an air pressure generator to the air outlet openings.

In one embodiment, it is provided that the at least one device for generating at least one gas bubble for at least partially enveloping the immersion body includes at least one cavitator. In one embodiment, it is provided that the immersion body includes at least one cavitator.

A cavitator in the sense of the present disclosure is a a geometric configuration of the device, such as of the immersion body. When the device is towed through a body of water, a pressure drops behind the cavitator in the direction of movement, for example due to vortex formation. The cavitator generates cavitation when towing the device into the body of water. In addition, supercavitation can be generated by the cavitator from a defined speed.

Cavitation in the sense of the present disclosure means that the pressure behind the cavitator is reduced so much by a displacement impulse, that the liquid changes into the vapour phase following its phase diagram. Cavitation is known to cause major damage to the cavitating body. The situation is different when supercavitation is reached. If the immersion body reaches a critical speed, a constant pressure drop occurs over the part of the immersion body that is below the water surface, which in turn results in a completely enveloping cavitation bubble or in a gas film at least partially on the immersion body or a gas bubble at least partially around the immersion body. This may occur at a speed of around 160 km/h or 45 m/s or more. The geometry of the cavitator can be used, for example, to set a defined speed at which cavitation occurs and/or stability of the cavitation bubble. In one embodiment, it is provided that the cavitator has a flat or planar design at the front, when viewed in cross-section. In an additional embodiment, it is the cavitator has a conical or round shape at the front, when viewed in cross-section. The cavitator forms a recess through which the pressure drop can be generated.

In one embodiment, the immersion body includes at least one line cavitator and/or a point cavitator. In one embodiment, it is provided that at least one cavitator on the sword section is adapted at least as a line cavitator and/or at least one cavitator of the torpedo-shaped section is adapted at least as a point cavitator. In one embodiment, it is provided that the sword section includes at least one line cavitator and/or the torpedo-shaped section includes a point cavitator. A line cavitator can, for example, be a geometric arrangement that extends over a longitudinal extension, such as from top to bottom, of the immersion body or the sword section. A point cavitator can, for example, have a rotationally symmetrical design.

In one embodiment, it is provided that a geometry of the at least one cavitator can be changed. The geometry of the at least one cavitator can be changed as a function of a speed at which the device or the immersion body is dragged through the body of water. In one embodiment, it is provided that an inflow surface of the cavitator can be changed from conical, spherical or pyramidal to essentially or generally flat. The geometry of the inflow surface can be changed by a mechanism, as a function of sensor data, which reflects a speed of the immersion body into the body of water. In addition, the geometry of the inflow surface can be changed by the dynamic pressure that is applied by the water when the immersion body is dragged through the body of water.

The at least one cavitator is arranged downstream of the at least one water inlet in the direction of movement. In one embodiment, the at least one air outlet is arranged downstream of the cavitator in the direction of movement. This can advantageously be used for a ventilated cavitation, such as a ventilated supercavitation. In the case of ventilated cavitation, a gas or air can be introduced into the cavitation bubble, or the cavitation bubble can be induced by gas or air flowing out of the air outlet openings. Ventilated cavitation generates a gas bubble at least partially around the immersion body or a gas film at least partially on the immersion body. In addition, ventilated cavitation can advantageously be used to create a comparable gas bubble around the immersion body as in the case of non-ventilated supercavitation, particularly at higher airspeeds.

Depending on the geometric design of the immersion body, supercavitation can take place, for example, from an airspeed of around 45 m/s to around 60 m/s. The immersion body is at least partially enveloped in a supercavitation bubble, whereby the power applied by the aircraft to tow the device is not significantly reduced by the supercavitation in some embodiments of the immersion body. In one embodiment, at higher speeds, for example about 90 m/s, the power required to overcome the frictional drag of the immersion body at least partially immersed into the body of water is less than at an airspeed of about 45 m/s to about 60 m/s. However, the drag force still increases with increasing speed due to the increased dynamic pressure. Ventilated cavitation, on the other hand, can advantageously be used to significantly reduce a drag coefficient compared to non-ventilated supercavitation even at lower airspeeds, for example about 25 m/s to about 80 m/s. In other embodiments, ventilated cavitation can advantageously be used to significantly reduce the drag coefficient compared to non-ventilated supercavitation at airspeeds of about 35 m/s to about 80 m/s. In other embodiments, ventilated cavitation can advantageously be used to significantly reduce the drag coefficient compared to non-ventilated supercavitation at airspeeds of about 45 m/s to about 80 m/s. In other embodiments, ventilated cavitation can advantageously be used to significantly reduce the drag coefficient compared to non-ventilated supercavitation at airspeeds of about 60 m/s to about 80 m/s.

In one embodiment, the amount of air introduced into the cavitation bubble can be reduced or completely suppressed once a stable cavitation bubble has been reached. Once created, the cavitation bubble can, in one embodiment, remain in place even without a further supply of air. In one embodiment, it is provided that the supply of air can be regulated or controlled by valves in the air conduit. The air supply can be controlled as a function of the airspeed. In an additional embodiment, the air supply is controlled in such a way that air is blown into the cavitation bubble at an airspeed of approximately 45 m/s to approximately 90 m/s. In other embodiments, the air supply is controlled in such a way that air is blown into the cavitation bubble at an airspeed of approximately 60 m/s to approximately 80 m/s. The amount of air is controlled as a function of the airspeed. In an additional embodiment, it is provided that at an airspeed of about 80 m/s to about 90 m/s, the air supply is stopped. For example, when the airspeed is at about 85 m/s to about 90 m/s, or from about 90 m/s, the air supply is stopped.

In an additional embodiment, it is provided that the amount of air for the ventilated cavitation is increased with increasing airspeed.

In one embodiment, it is provided that the immersion body has flight stabilisers. In particular, the flight stabilisers are designed as wing panels. In particular, the immersion body remains stable in the air during a lowering from the aircraft into the body of water by means of the flight stabilisers. As an advantage, the flight stabilisers ensure desirable immersion of the immersion body into the body of water. The flight stabilisers are attached to the centreboard. In one embodiment, the flight stabilisers are attached to the torpedo body. The flight stabilisers are attached to a part of the device that is not immersed into the body of water during intended use. The flight stabilisers can be folded out and folded in. As an advantage, the flight stabilisers are folded in when the device is retracted into the aircraft.

In one embodiment, it is provided that the immersion body includes at least one all-flying tail, such as one all-flying tail per side. In other embodiment, the immersion body includes two all-flying tails per side. The at least one all-flying tail is arranged on the torpedo-shaped section. In an additional embodiment, at least one all-flying tail is arranged on the sword section. In an additional embodiment, the all-flying tail is retractable and extendable and/or retractable or extendable. The all-flying tail can be retracted into the torpedo-shaped section. As an advantage, the all-flying tail can be retracted during lowering or immersion into the body of water so that it is not damaged during immersion. The immersion depth of the immersion body into the body of water can be controlled or regulated by the all-flying tail.

In one embodiment, it is provided that at least one immersion spur is arranged on the immersion body. The immersion spur ensures a defined immersion of the immersion body into the body of water. The immersion spur can have the shape of a fin or a torpedo shape and/or may include an all-flying tail. The immersion spur is arranged below the immersion body. In addition, the immersion spur can be at least partially retracted into the immersion body. In addition, an extension length of the immersion spur can be controlled. The immersion spur can be retracted into the immersion body after the immersion body has been immersed or a distance from the immersion body can be reduced. The immersion spur is arranged below the torpedo-shaped section.

In one embodiment of the device, it is provided that the device includes an airbag to prevent damage or loss of the device in the event of a collision with objects into the body of water. As an advantage, the airbag deploys when the device collides or threatens to collide with an object into the body of water, for example flotsam. This can prevent or at least reduce damage to both the device and the object. In an additional embodiment, it is provided that the device has at least one predetermined breaking point or predetermined tearing point, so that in the event of a collision with an object into the body of water, the device is torn away from the aircraft in a defined manner so as not to endanger the aircraft. In an additional embodiment, it is provided that the device is designed or configured to float. In an additional embodiment, it is provided that, in the event of an accident involving the device, a buoyancy body is automatically inflatable. As an advantage, the device can be recovered from the body of water in the event of an accident so that it can be reused after repair if necessary.

An exemplary device for taking up liquids from a body of water includes an immersion body with a sword section and a torpedo-shaped section. The sword section is streamlined in cross-section, for example, drop-shaped in cross-section. The sword section is thicker at a bow than at a stern. Due to one or more water inlet openings arranged at the bow of the immersion body, water is fed into, for example, three compartments within the immersion body and forced through the hose at the upper end of the device with a diameter of approximately 0.15 m into a water tank in an aircraft. As an advantage, this allows about 10 tonnes of water to be transported into the water tank into an aircraft in about 30 seconds at an airspeed of about 115 knots or about 60 m/s and a flight altitude of about 30 m above the surface of the water.

The sword section includes, for example, a water inlet opening that extends along the longitudinal extension of the sword section at the bow. The water inlet opening is arranged exclusively in an area of the sword section that is below the water surface when the device is used as intended. For example, a linear cavitator is provided on both sides of the water inlet opening on the bow, which extends from top to bottom along the longitudinal extension of the sword section. If the device is towed through the water at a speed of around 60 m/s or more, a supercavitation bubble is created which at least partially envelops the immersion body. This reduces the flow resistance coefficient of the device compared to a device that does not supercavitate. This significantly reduces the energy required to tow the device into the body of water. In particular, reducing the flow resistance in this way makes it possible to tow the device through the body of water at a speed of around 60 m/s or more.

The device has exemplary air outlet openings with which air can be blown out against the direction of movement of the device. For example, the air outlet openings are arranged behind the line cavitator in the direction of movement. To build up the supercavitation bubble quickly and stabilise it, air is blown through the air outlet openings against the direction of movement. If, for example, the speed of the aircraft is not sufficient to at least partially form a supercavitation bubble around the immersion body directly during immersion, the air blown out of the air outlet openings can also be used to form a gas bubble at least partially around the immersion body or a gas film at least partially on the immersion body, which reduces the flow resistance.

The torpedo-shaped section, which is arranged in an exemplary way at the lower end of the sword section, comprises a torpedo-shaped body with a point cavitator arranged on the bow side, which is adapted to be rotationally symmetrical. Exemplary air outlet openings are also arranged behind the point cavitator in the direction of movement, such that air can be blown out against the direction of movement. In the direction of movement in front of the point cavitator, a water inlet opening is provided, for example, which is connected to the compartments.

The immersion depth of the immersion body can be controlled or regulated by two all-flying tails on each side of the torpedo-shaped section.

In one embodiment, it is provided that the device includes a distance measuring device of which at least one immersion depth of the immersion body into the body of water and/or a wave height of the body of water can be determined. The distance measuring device includes, for example, a radar device, lidar device and/or an air pressure measuring device. In an additional embodiment, the distance measuring device includes a pressure sensor for determining a water pressure at the immersion body and/or at the immersion spur. The distance measuring device scans the water surface in the direction of movement. In addition, the data determined by the distance measuring device is used to control the all-flying tail of the immersion body. As an advantage, the distance measuring device can be used to control the immersion depth of the immersion body, which is dynamically adapted to changing conditions, depending on the wave height.

In addition, an immersion spur may be arranged below the torpedo-shaped section. The immersion spur supports the immersion body during immersion into the body of water. Advantageously, the immersion spur can be retracted or telescoped into the immersion body. The immersion spur includes at least one all-flying tail.

As an addition, a method for taking up liquids into an aircraft is proposed including the steps of
  providing a device of the type described above,
  connecting the device to a water tank into an aircraft,
  lowering the device into a body of water during a flight of
    the aircraft so that it is at least partially submerged into
    the body of water,
  taking up water from the body of water via water inlet
    openings in an immersion body of the device.

In one embodiment, it is provided that the device is connected to a device for deployment and retrieval for lowering from the aircraft and retrieval after filling the water tank.

In one embodiment, it is provided that a gas bubble is generated at least partially around the immersion body as described above.

In one embodiment, it is provided that the device is pressurised with air so that it flows out of the air outlet openings, so that the immersion body of the device immersed into the body of water is at least partially enveloped by air. In one embodiment, it is provided that the device is towed by the aircraft in such a way that air is blown out of the air outlet openings, which are communicatingly connected to the air inlet openings, by dynamic pressure at the air inlet openings, so that the immersion body of the device immersed into the body of water is at least partially enveloped by air. In one embodiment, it is provided that air is sucked out of air outlet openings by a Venturi effect, so that the immersion body immersed into the body of water is at least partially enveloped by air. In an additional embodiment, both the dynamic pressure and the Venturi effect are used to blow air out of the air outlet openings.

In one embodiment, it is provided that the immersion body is pulled through the body of water so quickly that cavitation, and supercavitation, is induced on the immersion body. In one embodiment, it is provided that supercavitation is induced on the immersion body immersed into the body of water by at least one cavitator. The immersion body is at least partially enveloped in a supercavitation bubble.

In one embodiment, it is provided that a ventilated cavitation is induced by air. Air is blown into a developing or existing cavitation bubble. In addition, it is air is blown out through at least one air outlet opening, for example in the direction of a stern of the immersion body. In addition, air is blown out through at least one air outlet opening approximately in the direction of movement of the immersion body. In addition, air is blown out through at least one air outlet opening perpendicular to the direction of movement, for example at the flanks of the immersion body. In addition, the cavitation bubble is stabilized by air from the at least one air outlet opening.

In one embodiment, it is provided that the extended immersion spur is immersed first during an immersion process of the immersion body. The immersion spur is immersed in the water first when the device is lowered into the body of water. The all-flying tail can be set at a small angle of attack, such as from about 0.5° to about 10°. In other embodiments, the all-flying tail can be set at angles of about 2° to about 5°, so that the device is pulled into the body of water. Due to the low angle of attack of the all-flying tail, no or only a low moment, such as no pitching moment, is applied to the immersion body when it is immersed. The immersion body can therefore be immersed into the body of water without tilting. The hose on the immersion body is not kinked by the \ parallel immersion of the immersion body and further no sudden force or force vector unpredictable by the pilot is applied to the aircraft. The immersion spur is also used to deploy the immersion body from the body of water. The all-flying tail of the immersion spur can be adjusted in such a way that the immersion body emerges from the body of water. Surfacing can take place by the pendulum rudders on the immersion body, at least until the all-flying tails of the immersion body are just below the surface of the water. In addition, in one embodiment, the immersion spur can be used for surfacing. In an additional embodiment, the immersion body has then risen far enough out of the water that it can be pulled up to the aircraft or pulled into an aircraft. The immersion body can then be retracted into an aircraft. The immersion spur is retracted into the immersion body after the immersion body has been immersed. In an additional embodiment, the immersion spur is retracted into the immersion body before the device is retracted into an aircraft.

In addition, an advantage of using the immersion spur for immersion and, for surfacing of the immersion body is that the immersion body does not experience a pitching moment during immersion and/or surfacing. When the immersion body enters the body of water, a gas bubble is formed around the immersed section of the immersion body in less than a second. A sudden change in direction or position of the immersion body, such as a pitching motion, can lead to a disruption of the gas bubble and possibly to a rupture of the gas bubble. This would abruptly increase the drag force on the immersion body, which would either be exerted on the aircraft or lead to the immersion body being torn off the device. In addition, damage to the immersion body due to cavitation is to be expected if the gas bubble is disturbed.

In one embodiment, it is provided that before the immersion body is at least partially immersed, it is stabilized in a flight phase by the unfolded flight stabilisers. The flight stabilisers are folded out when the device is lowered from the aircraft and folded in before being recovered into an aircraft.

In one embodiment, it is provided that after the at least partial immersion of the immersion body, at least one all-flying tail is brought into a deployed position. The position of the immersion body into the body of water is controlled or stabilized by means of the all-flying tail.

In addition, a use of the above-mentioned device for loading an aircraft with liquid is proposed. For example, the device can be used to load an aircraft with extinguishing water. In addition, the device can be used to skim oil or other contaminants from a body of water. In addition, the device can be used to collect contaminated water, for example.

An installation kit for an aircraft comprising the device of the type mentioned above and at least one water tank is proposed. In one embodiment, it is provided that the water tank is adapted as a sling tank.

In one embodiment, the installation kit includes a deployment and retrieval device for lowering the device from the aircraft into a body of water and raising it back up into the aircraft.

There is further proposed an aircraft includes a device of the type mentioned above and at least one water tank. In one embodiment, the aircraft includes an installation kit of the type mentioned above. In one embodiment, it is provided that the aircraft includes an extendable and/or telescopic device for deploying and inserting at least one immersion body of the device during flight of the aircraft.

BRIEF DESCRIPTION OF THE DRAWINGS

Further advantageous embodiments are shown in the following drawing. However, the embodiment shown there is not to be interpreted as limiting, rather the features described there can be combined with each other and with the features described above to form further embodiments. In addition, it should be noted that the reference signs given in the description of the figures do not limit the scope of protection of the present disclosure, but merely refer to the embodiment example shown in the figure.

DETAILED DESCRIPTION

Figure 1:
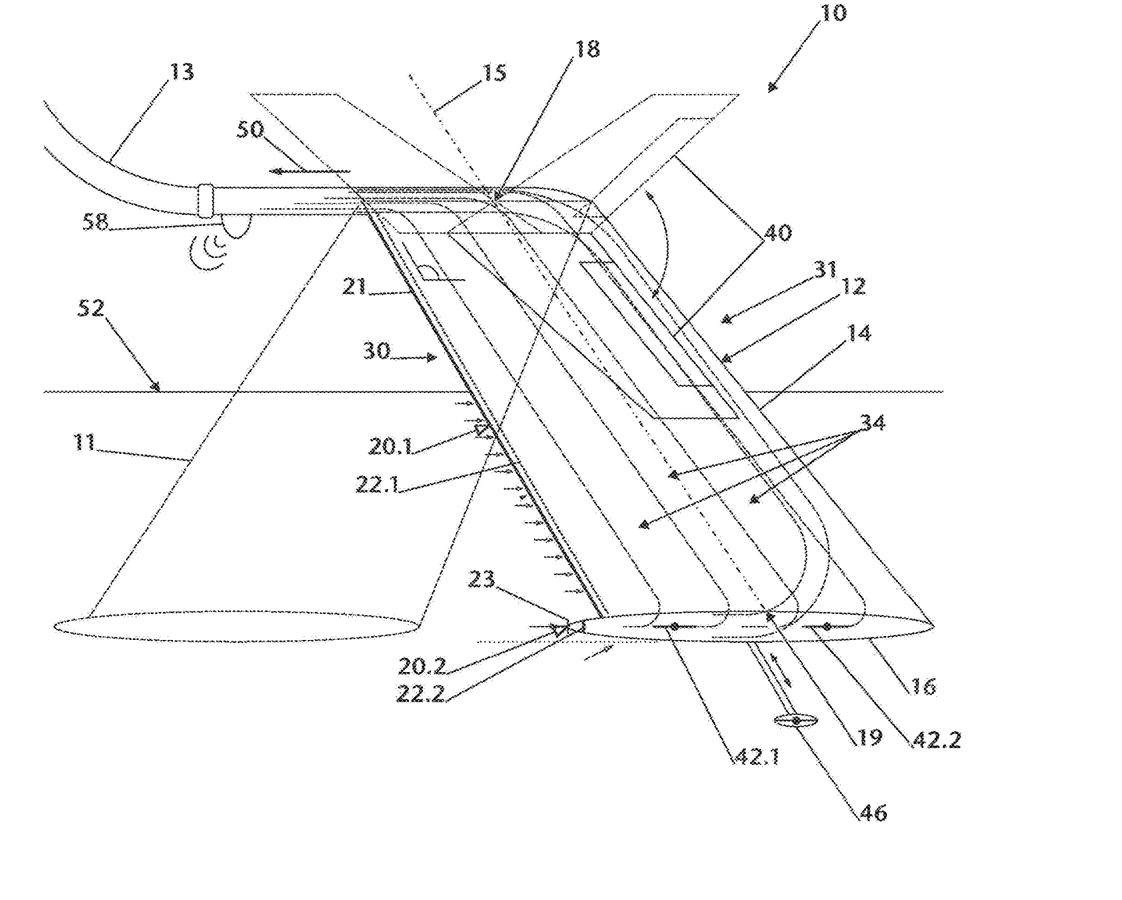
FIG. 1 schematically depicts a device for taking up liquids into the body of water according to the embodiments shown and described herein.

FIG. 1 depicts a device 10 for taking up liquids from a body of water 52. The device 10 includes an immersion body 12 with a sword section 14 and a torpedo-shaped section 16. The sword section 14 is streamlined in a cross-section not shown, for example drop-shaped in cross-section. The sword section is thicker at a bow 30 than at a stern 31. One or more water inlet openings 20.1, which are arranged at the bow 30, directs water into compartments 34 within the immersion body 12 and forced through the hose 13 with a diameter of approximately 0.15 m into a water tank into an aircraft, which is not shown. As an advantage, this allows about 10 tonnes of water to be transported into the water tank in the aircraft in about 30 seconds at an airspeed of about 115 kn or about 60 m/s and a flight altitude of about 30 m.

In addition, the sword section includes a linear cavitator 21 on both sides of the water inlet opening 20.1 on the bow 30, which extends from top to bottom along the longitudinal extension 15 of the device 10. If the device is pulled through the body of water at a speed of approximately 60 m/s or more, a supercavitation bubble is created which at least partially envelops the immersion body 12. This reduces the flow resistance coefficient compared to a device that does not supercavitate. This significantly reduces the amount of energy required to tow the device 10 through the body of water 52. In particular, a reduction in flow resistance achieved in this way makes it possible to tow the device 10 through the body of water 52 at a speed of around 60 m/s.

For a rapid build-up of the supercavitation bubble and its stabilisation, air is blown through air outlet openings 22.1 against the direction of movement 50. If, for example, the speed of the aircraft is not sufficient to at least partially form a supercavitation bubble around the immersion body 12 directly during immersion, a gas bubble can also be at least partially formed around the immersion body 12 by the air blown out of the air outlet openings 22.1, which reduces the flow resistance. Likewise, at an airspeed of about 35 m/s to about 90 m/s, a ventilated cavitation can occur which creates a gas bubble around the immersion body.

The torpedo-shaped section 16, which is arranged at the lower end 19 of the sword section 14, includes a torpedo-shaped body with a point cavitator 23 arranged on the bow side, which is adapted to be rotationally symmetrical. Air outlet openings 22.2 are also arranged behind the point cavitator 23 in the direction of movement 50, by which air can be blown out against the direction of movement. In the direction of movement in front of the point cavitator 23, a water inlet opening 20.2 is provided, which is connected to the compartments 34.

Two all-flying tails 42.1 and 42.2 on the torpedo-shaped section 16, the immersion depth of the immersion body 12 can be controlled or regulated. A distance measuring device 58 is provided on the device 10, which is designed as a radar, for example. This determines an immersion depth of the immersion body 12 and determines the swell that is present in front of the immersion body 12 in the direction of movement. The data obtained is used to control the all-flying tails 42.1 and 42.2 in order to keep the immersion body 12 at an immersion depth that is optimised for liquid absorption and flight safety.

In addition, an immersion spur 46 is arranged below the torpedo-shaped section 16. The immersion spur 46 supports the immersion body 12 during immersion into the body of water 52.

FIG. 1 indicates an alternative embodiment 11 of the device 10 with dashed lines, which in intended use can be towed through the body of water 52 at a different angle to a horizontal. In particular, a centre of gravity of the alternative embodiment 11 differs from the device 10 drawn with solid lines.

With the proposed device 10 as well as the method for taking up liquids into an aircraft and the proposed installation kit, fire-fighting from the air can also be effectively carried out by transport aircraft. A proposed aircraft, which already includes the device when it is first equipped, can also carry out effective fire-fighting due to the possible high flying speed when taking up water. Due to the high flight speed of the aircraft provided, the radius of action is significantly increased.

The invention claimed is:

1. A device for taking up liquids into an aircraft, comprising:
   at least one immersion body with at least one water inlet opening; and
   at least one of:
      at least one cavitator adapted for generating at least one gas bubble at least partially around the immersion body; or
      at least one device for generating the at least one gas bubble for at least partially enveloping the immersion body.

2. The device according to claim 1, wherein the at least one device for generating the at least one gas bubble includes at least one air outlet opening on the immersion body.

3. The device according to claim 1, wherein the immersion body comprises:
   a sword section having a longitudinal extension with an upper end and a lower end.

4. The device according to claim 1, wherein the immersion body comprises:
   at least one torpedo-shaped section.

5. The device according to claim 1, wherein the at least one air outlet opening is arranged downstream of the at least one water inlet opening in a direction of movement of the device.

6. The device according to claim 1, wherein the at least one water inlet opening is a plurality of water inlet openings and the at least one air inlet opening is a plurality of air outlet openings.

7. The device according to claim 2, wherein the immersion body comprises:
   a bow,
   wherein the at least one water inlet opening and the at least one air outlet opening are arranged at the bow.

8. The device according to claim 7, wherein the at least one air outlet includes a plurality of air outlet openings arranged along the bow in a longitudinal extension of the device.

9. The device according to claim 2, wherein the at least one air outlet opening is configured as a Venturi nozzle.

10. The device according to claim 1, wherein the at least one cavitator is positioned on a sword section and is configured as a line cavitator, or the at least one cavitator is positioned on a torpedo-shaped section and is configured as a point cavitator.

11. The device according to claim 10, wherein a geometry of the at least one cavitator is variable.

12. The device according to claim 1, wherein the immersion body comprises at least one flight stabilizer.

13. The device according to claim 1, wherein the immersion body comprises at least one all-flying tail.

14. The device according to claim 1, wherein at least one immersion spur is arranged on the immersion body.

15. The device according to claim 1, further comprising:
   a distance measuring device configured to determine at least an immersion depth of the immersion body into a body of water or a wave height of a body of water.

16. The device according to claim 1, further comprising:
   an airbag for preventing damage in the event of a collision with objects into a body of water.

17. A method for taking up liquids into an aircraft, comprising the steps of:
   providing a device according to claim 1,
   connecting the device to a water tank in an aircraft,
   lowering the device into a body of water during a flight of the aircraft so that it is at least partially immersed into the body of water,
   taking up water from the body of water via water inlet openings in an immersion body of the device.

18. The method according to claim 17, wherein air is applied to the device so that it flows out of air outlet openings in such a way that the immersion body of the device immersed into the body of water is at least partially enveloped by a gas bubble.

19. The method according to claim 18, wherein air is drawn from air outlet openings a Venturi effect.

20. The method according to claim 19, wherein a ventilated cavitation is induced by the air.

21. The method according to claim 19, wherein a supercavitation is generated on the immersion body immersed into the body of water via at least one cavitator.

22. The method according to claim 18, wherein during the at least partial immersing of the immersion body, an extended immersion spur is immersed first.

23. The method according to claim 22, wherein before the at least partial immersing of the immersion body, the immersion body is stabilised in a flight phase by at least one unfolded flight stabilizers.

24. The method according to claim 23, wherein at least one all-flying tail is brought into a working position after the at least partial immersing of the immersion body.

25. An installation kit for an aircraft comprising:
the device according to claim 1; and
at least one water tank.

26. An aircraft comprising:
the device according to claim 1; and
at least one water tank.

27. The aircraft according to claim 26, further comprising:
an extendable device for deploying and inserting the at least one immersion body of the device during a flight of the aircraft.

* * * * *